(12) United States Patent
Aranguren et al.

(10) Patent No.: US 9,460,003 B2
(45) Date of Patent: Oct. 4, 2016

(54) USING AN ALIAS VOLUME NAME FOR A VOLUME TO ALLOCATE SPACE TO A DATA SET

(71) Applicant: INTERNATIONAL BUSINESS MACHINES CORPORATION, Armonk, NY (US)

(72) Inventors: Herman Aranguren, Tucson, AZ (US); Franklin E. McCune, Tucson, AZ (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/875,625

(22) Filed: Oct. 5, 2015

(65) Prior Publication Data

US 2016/0026407 A1 Jan. 28, 2016

Related U.S. Application Data

(63) Continuation of application No. 14/550,674, filed on Nov. 21, 2014, now Pat. No. 9,268,679, which is a continuation of application No. 12/904,859, filed on Oct. 14, 2010, now Pat. No. 8,918,614.

(51) Int. Cl.
*G06F 12/00* (2006.01)
*G06F 12/02* (2006.01)
*G06F 3/06* (2006.01)

(52) U.S. Cl.
CPC ........... *G06F 12/023* (2013.01); *G06F 3/0605* (2013.01); *G06F 3/0608* (2013.01); *G06F 3/0631* (2013.01); *G06F 3/0683* (2013.01); *G06F 3/0689* (2013.01)

(58) Field of Classification Search
CPC .. G06F 12/023; G06F 3/0605; G06F 3/0631; G06F 3/0683
USPC ......................................................... 711/170
See application file for complete search history.

(56) References Cited

U.S. PATENT DOCUMENTS 7,337,299 B2 2/2008 Sakaki et al.
7,340,571 B2 3/2008 Saze
(Continued)

OTHER PUBLICATIONS

E. Chai, et al., "A Case Study on Large-Scale Disk System Concatenating Free Space", IEEE, 2007, pp. 1-4.
M. Flouris, "Extensible Networked-Storage Virtualization with Metadata Management at the Block Level", University of Toronto, 2009, pp. 1-191.
S. Wu, et al., "JOR: a Journal-Guided Reconstruction Optimization for RAID-Structured Storage Systems", IEEE, 2009, pp. 1-8.
(Continued)

*Primary Examiner* — Matthew Bradley
(74) *Attorney, Agent, or Firm* — David W. Victor; Konrad Raynes Davda & Victor LLP (57) ABSTRACT

Provided are a computer program product, system, and method for using an alias volume name for a volume to allocate space to a data set. An assignment of a plurality of volumes to a data set is maintained, wherein the volumes are configured in a storage system. A request is received to extend the data set. An alias volume name is assigned to the data set for a previously assigned volume to the data to extend the data set in response to one of the previously assigned volumes having available space to extend the data set. A base volume name is assigned to the data set for a volume not assigned to the data set in response to one of the previously assigned volumes to the data set not having available space to extend the data set.

21 Claims, 5 Drawing Sheets

(56) References Cited

U.S. PATENT DOCUMENTS

| | | |
|---|---|---|
| 7,454,449 B2 | 11/2008 | Plow et al. |
| 7,487,308 B1 | 2/2009 | Dalal et al. |
| 7,587,568 B2 | 9/2009 | Murthulingam et al. |
| 7,594,085 B1 | 9/2009 | Rao |
| 7,603,532 B2 | 10/2009 | Rajan et al. |
| 7,711,924 B2 | 5/2010 | Kalos et al. |
| 2006/0036645 A1 | 2/2006 | Dao et al. |
| 2009/0077097 A1 | 3/2009 | Lacapra et al. |
| 2010/0070734 A1 | 3/2010 | Agombar et al. |
| 2010/0077255 A1 | 3/2010 | Lehr et al. |
| 2012/0096236 A1 | 4/2012 | Aranguren et al. |
| 2015/0081997 A1 | 3/2015 | Aranguren et al. |

OTHER PUBLICATIONS

Office Action dated Dec. 23, 2013, pp. 8, for U.S. Appl. No. 12/904,859, filed Oct. 14, 2010.
Response dated Mar. 24, 2014, pp. 10, to Office Action dated Dec. 23, 2013, pp. 8, for U.S. Appl. No. 12/904,859, filed Oct. 14, 2010.
Notice of Allowance dated Aug. 18, 2014, for U.S. Appl. No. 12/904,859, filed Oct. 14, 2010.
Office Action dated Jan. 7, 2015, pp. 12, for U.S. Appl. No. 14/550,674, filed Nov. 21, 2014.
Response dated Apr. 7, 2015, pp. 10, to Office Action dated Jan. 7, 2015, pp. 12, for U.S. Appl. No. 14/550,674, filed Nov. 21, 2014.
Notice of Allowance dated Jul. 6, 2015, pp. 8, for U.S. Appl. No. 14/550,674, filed Nov. 21, 2014.
Notice of Allowance dated Oct. 23, 2015, pp. 8, for U.S. Appl. No. 14/550,674, filed Nov. 21, 2014.

USING AN ALIAS VOLUME NAME FOR A VOLUME TO ALLOCATE SPACE TO A DATA SET

CROSS-REFERENCE TO RELATED APPLICATION

This application is a continuation of U.S. patent application Ser. No. 14/550,674, filed on Nov. 21, 2014, which is a continuation of U.S. patent application Ser. No. 12/904,859, filed Oct. 14, 2010, and issued as U.S. Pat. No. 8,918,614 on Dec. 23, 20114, which patent applications and parent are incorporated herein by reference in their entirety.

BACKGROUND OF THE INVENTION

1. Field of the Invention

The present invention relates to a computer program product, system, and method for using an alias volume name for a volume to allocate space to a data set.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. In the prior art, when extending a data set by adding an extent of data, where an extent comprise a range of tracks, extents are drawn from a new volume, even if volumes previously assigned to the data set now have more free space for assigning an additional extent to the data set. The reason for this limitation that data cannot re-extend back to a prior volume, not comprising the last assigned volume, is that the order of the data as written to the data set must be preserved. If data was allocated from a volume already assigned to the data set that is not the last volume from which data was allocated to the data set, then that data would be combined with data previously written from that prior volume during volume read activities, which will cause data to be read in an incorrect order. Thus, the different volume names allow for distinction of the order of data in the data set, and reusing a previous volume from which data was allocated could cause confusion as to the order for data read from that volume.

There is a need in the art for improved techniques to allocate data from a previously assigned volume to a data set.

SUMMARY

Provided are a computer program product, system, and method for using an alias volume name for a volume to allocate space to a data set. An assignment of a plurality of volumes to a data set is maintained, wherein the volumes are configured in a storage system. A request is received to extend the data set. A determination is made as to whether one of the volumes previously assigned to the data set has an allocation amount of available space in the storage system in response to the request to extend the data set. An alias volume name is assigned to the data set for the previously assigned volume determined to have the allocation amount of available space, wherein the alias volume name provides an alternative name for the previously assigned volume. The allocation amount of available space is assigned to the data set for the alias volume name.

DETAILED DESCRIPTION

Figure 1:
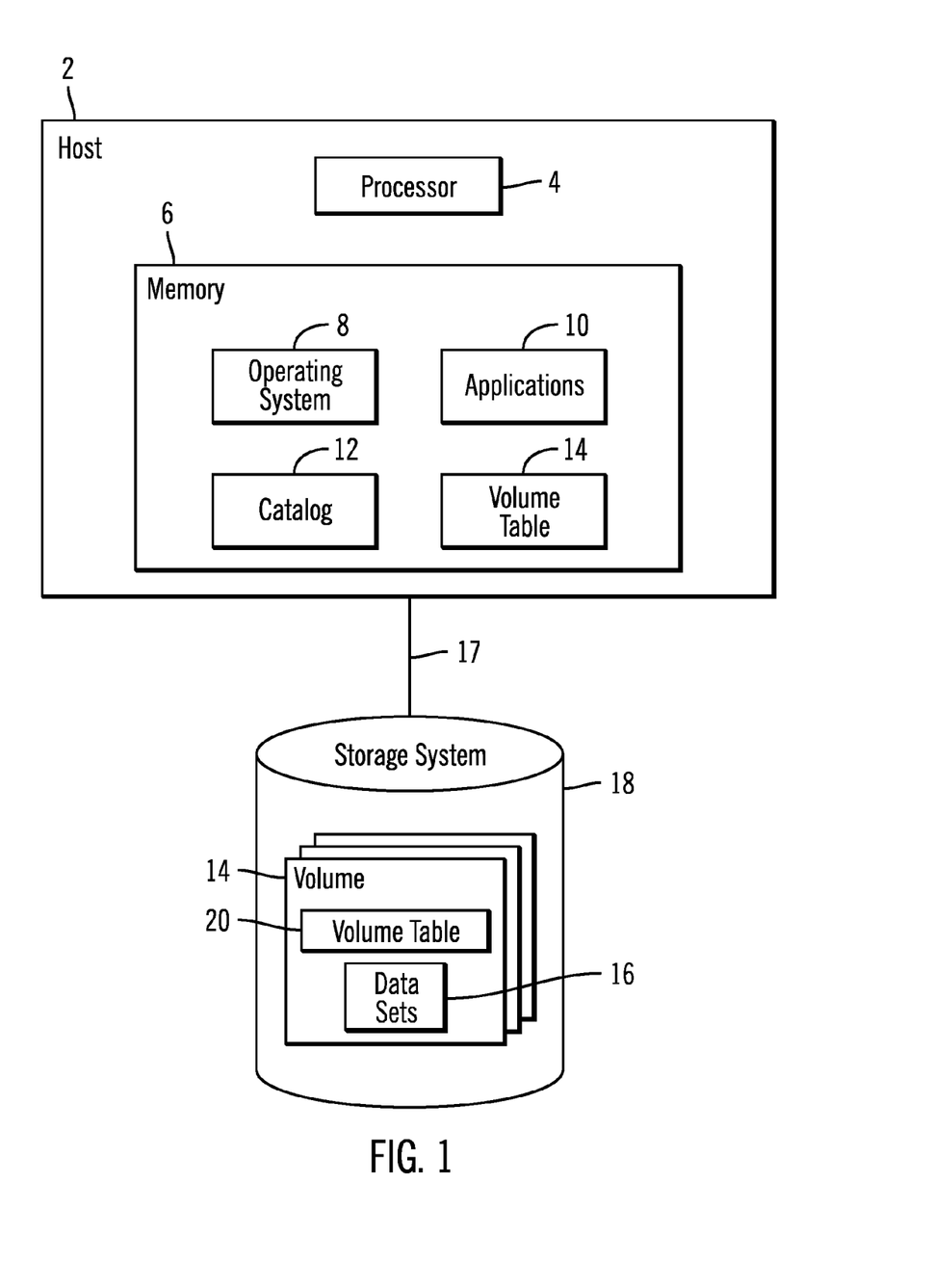
FIG. 1 illustrates an embodiment of a computing environment.

FIG. 1 illustrates an embodiment of a computing environment. A host 2 includes a processor 4, which may comprise one or more processors, and a memory 6 including programs, such as an operating system 8 and application 10, and a data set catalog 12 providing information on data sets 14 stored in volumes 16 configured in storage space in a storage system 18. The memory 6 may comprise one or more volatile memory devices, such as an on-board cache memory and/or a type of Random Access Memory (RAM). The one or more applications 10 submit data requests to the operating system 8 that are sent to the storage system 18. The host 2 may also receive data requests directed to the storage system 18 from other systems that communicate with the host 2 via a network.

A data set 16 comprises a collection of data intended to be stored in a same logical allocation of data, such as data from a single application, user, enterprise, etc. A data set may be comprised of separate files or records, or comprise a single file or record. The data sets 16 may comprise indexed data sets that are indexed according to a primary key that is used to locate records in the data set 16. Data set indexes provide an index for each indexed data set 16. For instance, the data set may comprise a Key Sequenced Data Set (KSDS) used in the IBM Virtual Storage Access Method (VSAM) storage, where each record in the KSDS data set has a unique key used to locate the record in the data set 22.

The host 2 may comprise a computational device known in the art, such as a workstation, mainframe, server, etc. The host 2 may communicate Input/Output (I/O) requests to a control unit for the storage system 18, such as a storage subsystem or server, such as an enterprise storage server, storage controller, etc., or other device used to manage I/O requests to attached volumes. The storage system 18 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The host 2 communicates with the storage system via a connection 17. The connection 17 may comprise a network such as a Local Area Network (LAN), Storage Area Network (SAN), Wide Area Network (WAN), peer-to-peer network, wireless network, etc. Alternatively, the connection 17 may comprise a bus interface, such as a Peripheral Component Interconnect (PCI) bus or serial interface. The operating system 8 may comprise suitable operating systems known in the art, such as the International Business Machines ("IBM®") z/OS® operating system. (IBM and z/OS are trademarks of IBM in the United States and foreign countries).

The operating system 8 receives data requests from the applications 10 for data The applications 6 may include middleware, access methods, and independent software vendor (ISV) products. The host 2 may also receive I/O requests from applications on systems over a network.

Each volume 14 includes a volume table 20 having information on the volume, including a mapping of tracks and extents of tracks to data sets 16. The volume table 20 may be stored in the volume 14, such as in the first few records of the volume, as in the case of a volume table of contents (VTOC), or may be stored as metadata external to the volume 14.

Figure 2:
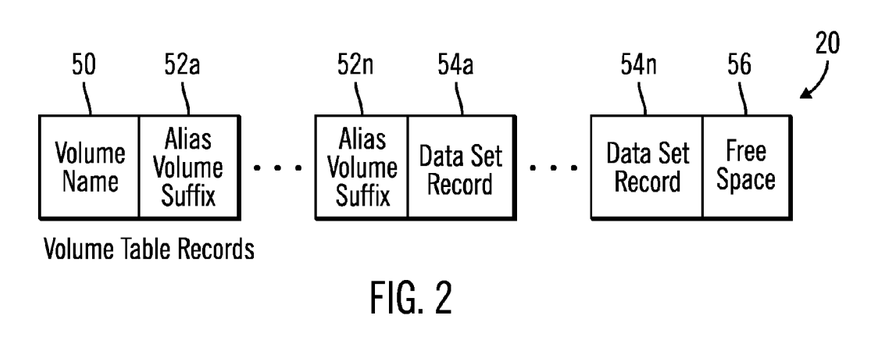
FIG. 2 illustrates an embodiment of volume table records.

FIG. 2 provides an embodiment of an arrangement of information maintained in the volume table 20. The volume table 20 includes a volume name 50, also known as a volume serial number, e.g., a VOLSER, that provides a unique identifier of the volume. The volume name 50 may be included in the name of the volume table 50 in the volume 14. The volume name 50 comprises a base volume name for the identified volume 20. The volume table 20 further includes zero, one or more alias volume suffixes $52a \ldots 25n$. Combining one alias volume suffix $52a \ldots 52n$ with the base volume name 50 forms a name for an alias volume for the volume 20 having the volume name 50. An alias volume suffix $52a \ldots 52n$ may comprise an additional byte at the end of the volume name 50 or, alternatively, combined with some subset of the volume name 50. In certain embodiments, providing no alias volume suffixes means there is no alias name. For instance, if the suffix $52a$ is an "A", then the base volume name 50 in combination with the suffix "A" comprises a first alias volume. If there is a second alias suffix $52n$ of "B" combined with the volume name 50 forms a second alias name. The volume table 20 further includes one or more data set records $54a \ldots 54n$ indicating data sets having extents configured in the volume identified by the volume table 20. The volume table 20 further includes one or more free space records 56 identifying ranges of available tracks in the volume 20. The freespace is available for the base volume name 50 and any alias volumes having the combined volume name 50 and a suffix name $52a \ldots 52n$.

In an alternative embodiment, the alias volume suffix $52a \ldots 52n$ may indicate the full alias volume name, and not require combination with all or part of the base volume name 50. Thus, the alias volume name may be determined from the alias volume suffix $52a \ldots 52n$ alone or in combination with all or some portion of the volume name 50.

Figure 3:
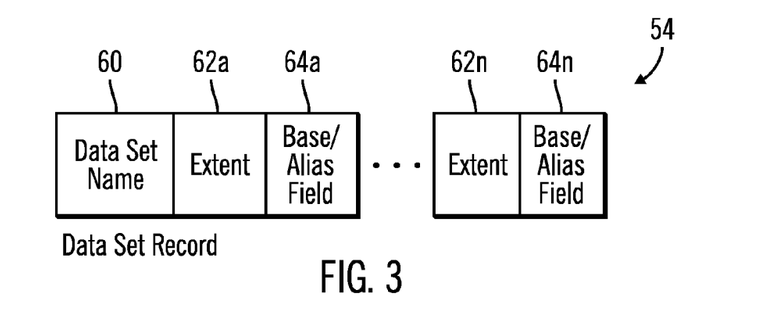
FIG. 3 illustrates an embodiment of a data set record in the volume table records.

FIG. 3 illustrates an embodiment of a data set record 54, such as the data set records $54a \ldots 54n$, included in the volume table records 20. Each data set record 54 includes a data set name 60 and one or more extents $62a \ldots 62n$ assigned to the data set 54. The extent provides a mapping to tracks in the volume identified by the volume table 20. Each extent $62a \ldots 62n$ is associated with a base/alias field $64a \ldots 64n$. A base/alias field $64a \ldots 64n$ indicates whether the extent is assigned to the base volume 50 or an alias volume, identified by the alias volume suffix $52a \ldots 52n$ to which the data set name 56 is assigned. Thus, if the base/alias field $64a \ldots 64n$ for a data set indicates an alias volume suffix $52a \ldots 52n$, then the alias volume to which that data set is assigned has the name formed by the combination of the volume name 50 and that alias volume suffix $52a \ldots 52n$. The field $64a \ldots 64n$ may indicate that the associated data set 60 is assigned to the base volume by indicating the base volume name 50 or being blank or including another value indicating the base volume name.

The reference numeral "n" used herein may refer to any number of instances of an element to which it is attached, and may refer to the same or different number of instances when used with different elements.

Figure 4:
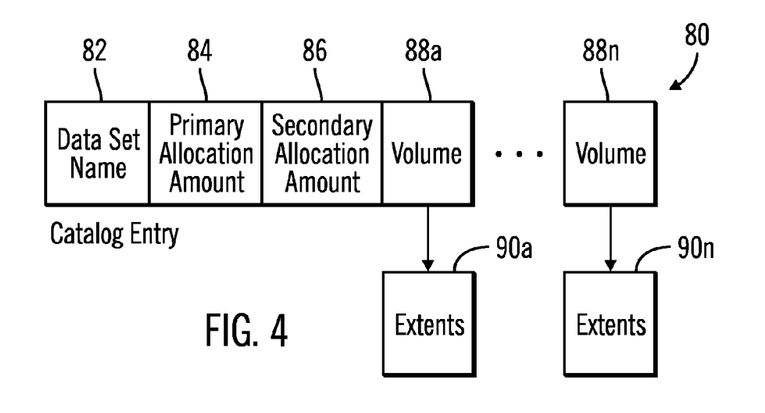
FIG. 4 illustrates an embodiment of a catalog entry for a data set.

The operating system 8 may maintain a data set catalog 12 providing information on data sets having extents in one or more volumes 20. FIG. 4 illustrates an embodiment of a catalog entry 80 in the catalog 12, including a data set name 82, a primary allocation amount 84 indicating an amount of available space needed when initially assigning space from a volume or alias volume, a secondary allocation 86 indicating an amount of available space needed when assigning available space from a volume or alias volume after the initial assignment and before another volume is considered, and the volumes $88a \ldots 88n$ in which the data set 82 is assigned extents. The volumes $88a \ldots 88n$ are listed in the order in which extents from the volume are assigned to the data set 82, and indicate base volume names or alias volume names. For each volume $88a \ldots 88n$, the catalog entry 80 provides the extents $90a \ldots 90n$ from the volume that are assigned to the data set 82. The extents $90a \ldots 90n$ for one volume may be listed in the order in which they are assigned to the data set 82. The catalog 12 may be organized by a key comprising the data set name to allow searching on the data set name to obtain the entry 80 for a data set name.

When creating a data set 16, the operating system 8 would create an entry 80 in the catalog 12 and indicate the primary 84 and secondary 86 allocation amounts. The operating system 8 would then locate a first volume $88a$ having the primary allocation amount 86 available and assign a first extent in that volume $88a$ to the data set, and indicate the configured extent $90a$ in the catalog entry 80 for the created data set. The volume $88a$ would be used to assign further extents if the volume $88a$ has the secondary allocation amount 86 of space available for further extents. If the volume $88a$ does not have the secondary allocation amount 86 of available space, then the operating system 8 would locate a next volume, e.g., $88n$ or further, having the primary allocation amount 84 of space available for a first extent. This process of assigning extents to the data set from a volume until that volume has no further secondary allocation amounts 86 of available space and then moving on to a next volume is performed until all extents are assigned as part of creating the data set 82. In certain embodiments, the primary 84 and secondary 86 allocation amounts may be different, where the primary amount 84 is greater than the secondary amount 86, and in alternative embodiments the primary 84 and secondary 86 amounts may be the same. The volumes $88a \ldots 88n$ may indicate a base volume name 50 or an alias volume name comprising the base volume name 50 and alias volume suffix $52a \ldots 52n$ name.

Figure 5:
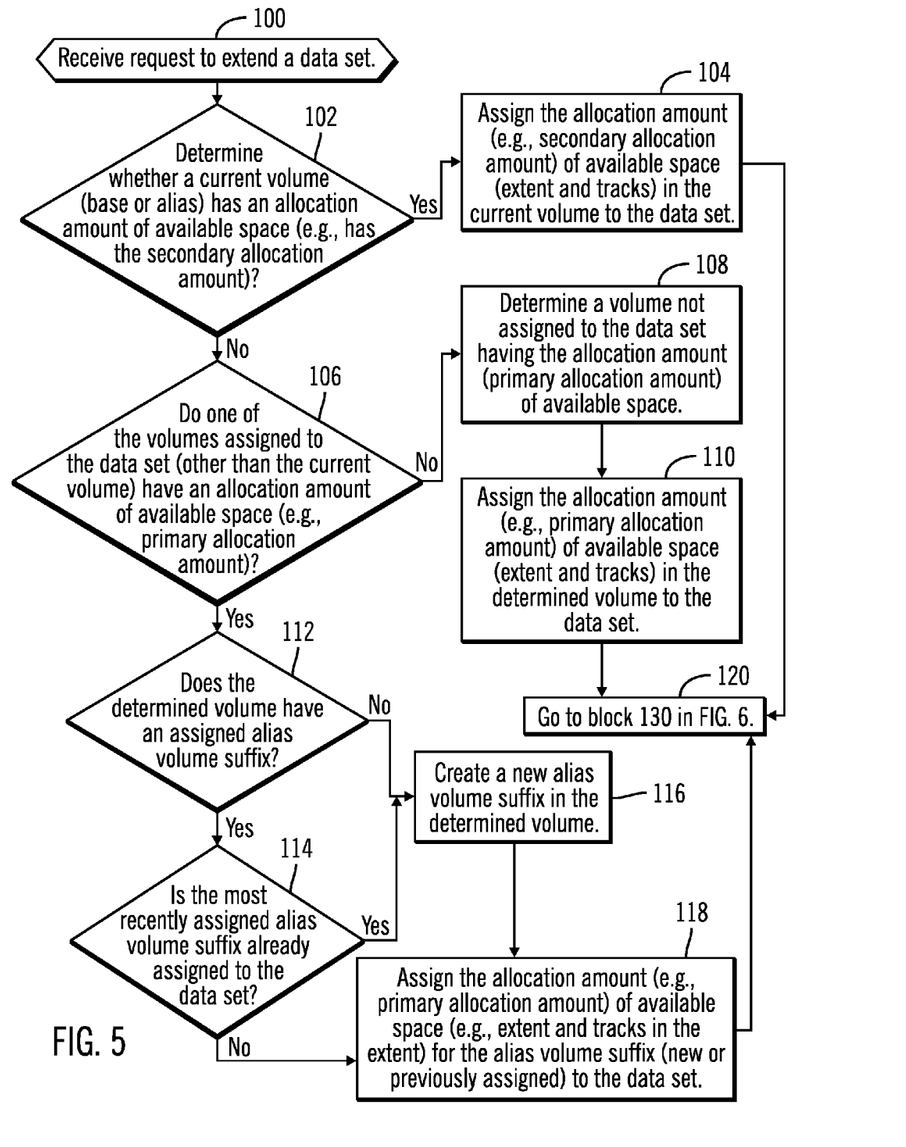
FIGS. 5 and 6 illustrate an embodiment of operations to allocate space from a volume to extend a data set.
Figure 6:
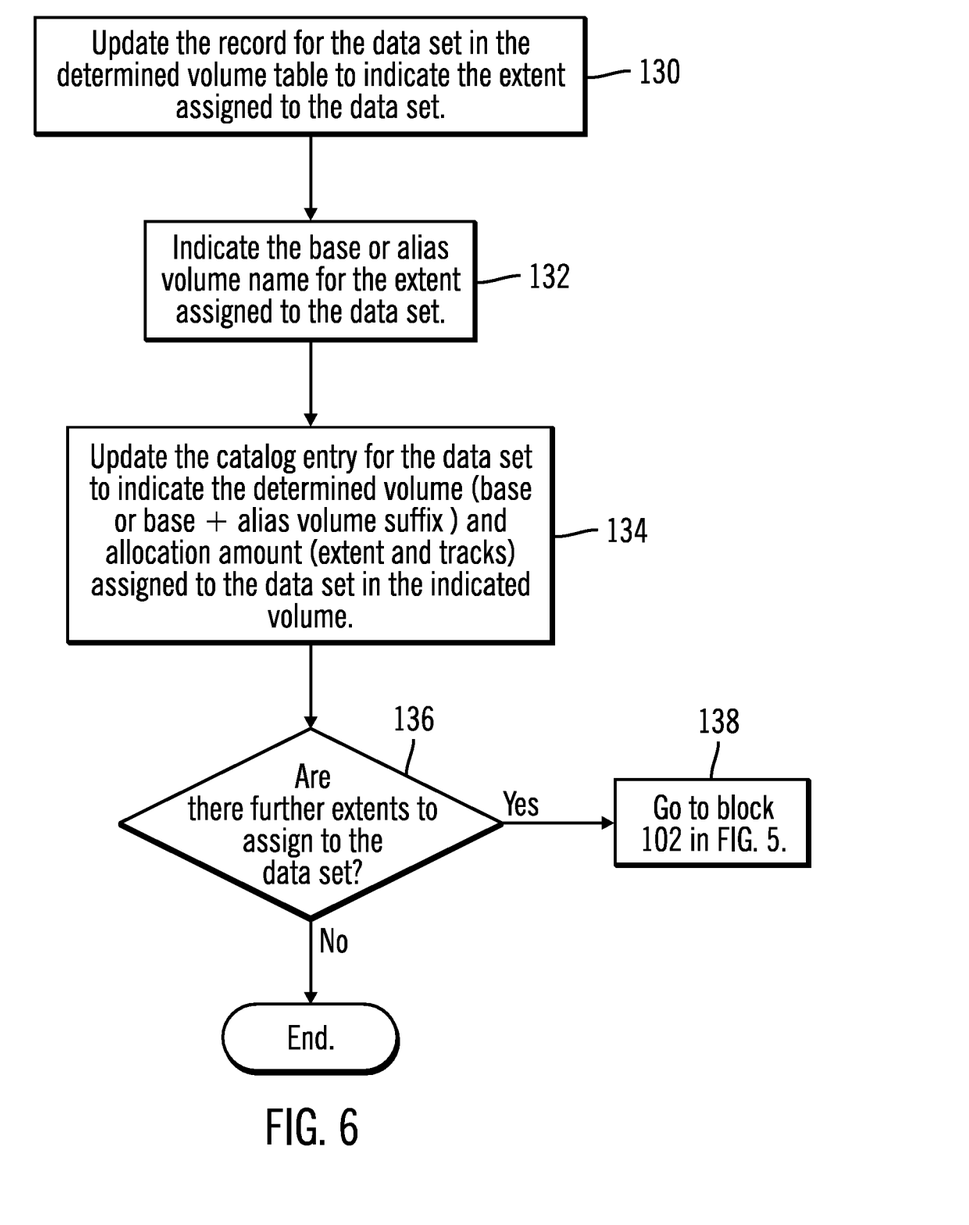

FIGS. 5 and 6 illustrate an embodiment of operations performed by the operating system 8 to extend or allocate additional space to an existing data set 16, which means one or more extents were previously assigned from one volume 14 to the data set. With respect to FIG. 4, upon receiving (at block 100) a request to extend a data set 16, the operating system 8 determines (at block 102) whether a current volume, comprising the volume or alias volume (alias volume suffix $52a \ldots 52n$) from which space was last assigned to the data set 16, e.g., volume $88_n$, has an allocation amount of available space for a further extent, which may comprise the secondary allocation amount 86. If (at block 102) the current volume has the allocation amount of space, then the operating system 8 assigns (at block 104) the allocation amount (e.g., secondary allocation amount) of available space for one or more extents of tracks in the current volume to the data set. If (at block 102) the current volume does not have the allocation amount of space available, then the operating system 8 determines (at block 106) whether one of the volumes already assigned to the data set (other than the current volume 88$_n$), which would be volumes 88a through 88$_{n-1}$, have an allocation amount of available space, such as the primary allocation amount 84, because the allocation would be switching to another (previously assigned) base or alias volume. In considering the previously assigned volumes 88a ... 88$_{n-1}$, the operating system 8 may start from the first assigned volume 88a and proceed in order to consider volumes through 88$_{n-1}$. Further, the volumes 88a ... 88$_{n-1}$ may comprise base volumes and alias volume names.

If (at block 106) no previously assigned volume 88a ... 88$_{n-1}$ has the allocation amount (e.g., primary allocation amount 84), then the operating system 8 determines (at block 108) a volume not assigned to the data set 16 having the allocation amount (primary allocation amount) of available space. Determining such a volume may involve configuring a new volume 14 in the storage system 18 if there is no volume available. The operating system 8 assigns (at block 110) the allocation amount (e.g., primary allocation amount 84) of available space (for extents) in the determined volume to the data set.

If (at block 106) a previously assigned volume 88a ... 88$_{n-1}$ does have the allocation amount of available space for a further extent, which may be determined from the free space records 66 for the volume, then the operating system 8 determines (at block 112) whether the determined volume has an assigned alias volume suffix 52. If so, then the operating system 8 determines (at block 114) whether a most recently assigned alias volume suffix 52n is already assigned to the data set being allocated, which may be determined from the base/alias fields 64a ... 64n for the data set name 60 in the volume table 20 or from the catalog entry 80 for the data set indicating volumes 88a ... 88n assigned to the data set, which may include alias volume names.

The operating system 8 assigns (at block 116) a new alias volume suffix, which may comprise a first alias volume name (from the no branch of block 112) or an additional alias volume suffix (from the yes branch of block 114) if the alias volume suffix has been assigned to the data set. The operating system 8 then assigns (at block 118) the allocation amount (e.g., primary allocation amount 84) of available space in extents for the created new alias volume suffix to the data set. If (at block 114) the most recently assigned alias volume suffix 52n is not already assigned to the data set being extended, then control proceeds to block 118 to use the most recently assigned alias volume suffix 52n to assign the allocation amount to the data set.

After assigning space from the current volume (from block 104), a volume not previously assigned to the data set (from block 110) or a new or existing alias volume suffix (from block 118), the operating system 8 proceeds (at block 120) to block 130 in FIG. 6) to update the data set record 54 (FIG. 3) for the data set being extended to indicate the allocation of the extents. At block 130, the operating system 8 updates a record 54 (FIG. 2) for the data set 56 in the determined volume table 20 to indicate the space (e.g., extent 60n) assigned to the data set 56. The operating system 8 further indicates (at block 132) in the base/alias field 64a ... 64n the base name 50 or alias volume name (base volume name 50 and alias volume suffix 52n) for which the extent was allocated. If the extent is assigned from a base volume name, then the base/alias field 64n may be left blank or indicate the base volume name 50. The operating system 8 then updates (at block 134), the catalog entry 80 for the data set to indicate the determined volume 88n (base or alias volume name) and allocation amount (extent, e.g., 90a) assigned to the data set in the indicated volume. If (at block 136) there are further extents to assign to the data set, then control proceeds (at block 138) back to block 102 in FIG. 4 to assign further extents. Otherwise, if (at block 136) there are no further extents to assign to the data set, then control ends.

Figure 7:
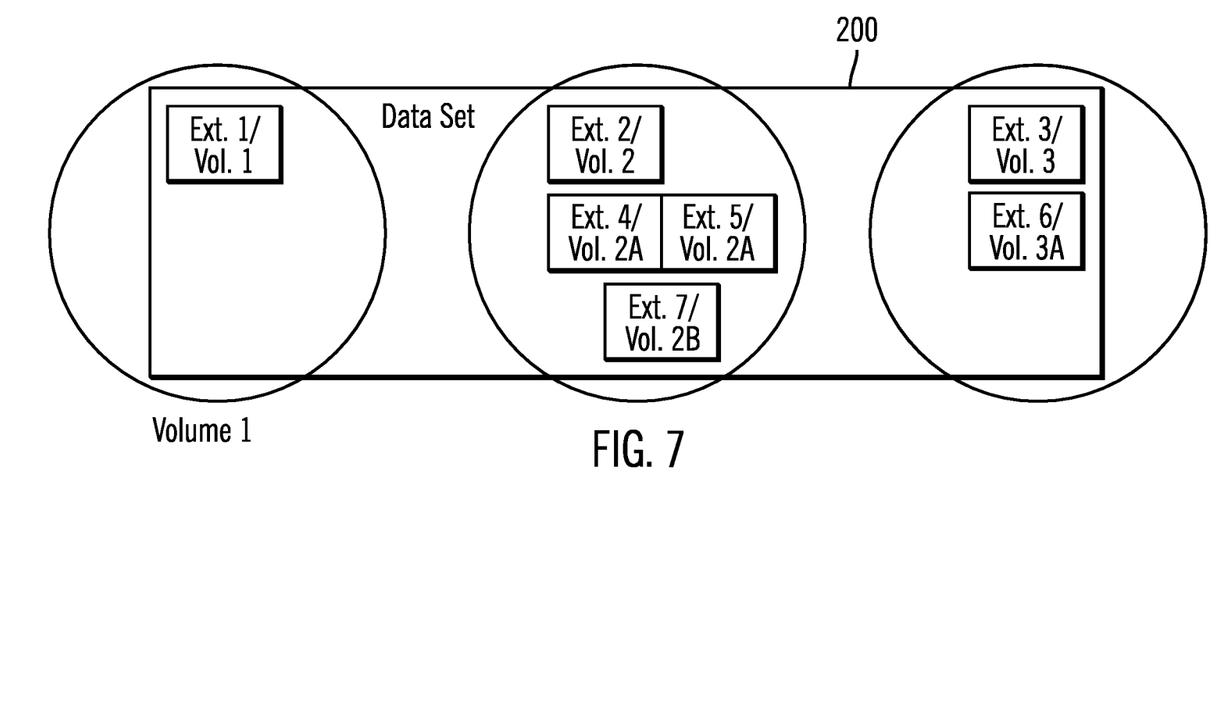
FIG. 7 illustrates an example of how extents are allocated from volumes and alias volumes to a data set.

FIG. 7 illustrates an example of how base and alias volume names are assigned to extents in a data set 200 from volumes 1, 2, and 3. Extents 1, 2, and 3 are assigned from the base volumes 1, 2, and 3. Then extents 4 and 5 are assigned from alias volumes 2A in volume 2, extent 6 is assigned from alias volume 3A in volume 3, and extent 7 is assigned from further alias volume 2B in volume 2. In this way, the order in which extents are assigned within one volume is indicated by the alias volume names, which themselves provide an order. The catalog entry 80 indicates the order in which volumes (base and alias) are used to assign the extents to allow a determination of the order of extents among volumes.

With the described embodiments, the operating system uses an alias volume name not previously assigned to the data set to allocate available space from a volume previously assigned to the data set. This allows unique volume names to be continually assigned to the data set to allow a preservation of the order in which volumes were assigned to the data set and to allow the use of available space in a volume or alias volume name previously assigned to the data set. This allows data from a previously assigned volume to be assigned to a data set being extended, so that the order can be determined by an ordering of unique volume names, including alias volume names when reusing a previously assigned volume, which was not the last assigned volume. This avoids the situation where extents assigned from the same volume are read incorrectly when combined in the memory because in the described embodiments, each data set is from a uniquely defined volume name in an ordering of volumes. So the extent for a data set assigned later may be distinguished from the extents assigned prior to the current volume.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the server of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the server of FIG. 1 may provide clients, and other servers and software and/or hardware components in the networked cloud, with data set management services. The host 2 may provide reliable storage services and access to the storage system 18 to meet quality of service requirements for customers in the cloud, including clients requiring storage and other servers providing storage services to clients. The host 2 may communicate with clients to provide storage services for the storage systems through a web interface or other application programming interface.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5 and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product to allocate space in volumes to data sets in a storage system, the computer program product comprising a non-transitory computer readable storage medium having computer readable program code embodied therein that executes to perform operations, the operations comprising:
    maintaining an assignment of a plurality of volumes to a data set, wherein the volumes are configured in the storage system;
    receiving a request to extend the data set;
    assigning a secondary allocation amount of available space from a current volume from which space was last assigned to extend the data set in response to the current volume having available space to extend the data set; and
    assigning a primary allocation amount of available space from a previously assigned volume comprising one of the volumes assigned to the data set other than the current volume having sufficient available space for the primary allocation amount when the current volume does not have available space for the secondary allocation amount.

2. The computer program product of claim 1, wherein the primary allocation amount from the previously assigned volume is assigned an alias volume name, wherein the alias volume name provides an alternative name for the previously assigned volume and wherein the alias volume name was not previously assigned to the data set.

3. The computer program product of claim 2, wherein assigned alias and base volume names comprise unique volume names not previously assigned to the data set to allow a preservation of an order in which the volumes were assigned to the data set, wherein the order can be determined by an ordering of the unique volume names of the alias and base volume names assigned to the data set.

4. The computer program product of claim 1, wherein the operations further comprise:
    assigning the primary allocation amount of available space in a volume not assigned to the data set to extend the data set when the volumes assigned to the data set including the current volume do not have available space to extend the data set.

5. The computer program product of claim 1, wherein the operations further comprise:
    determining whether the previously assigned volume has an assigned alias volume name already assigned to the data set;
    assigning the primary allocation amount for the assigned alias volume name when the assigned alias volume was not assigned to the data set;
    assigning an additional alias volume name to the previously assigned volume in response to determining that the assigned alias volume name assigned to the previously assigned volume was previously assigned to the data set; and
    assigning the available space in the additional alias volume name to extend the data set in response to assigning the additional alias volume name to the volume.

6. The computer program product of claim 1, wherein the primary allocation amount for the data set comprises an allocation amount of available space when space in the volume and alias volume is first assigned to the data set, and wherein the secondary allocation amount for the data set comprises an amount of space that must be available in the current volume when assigning available space to the data set following the space first assigned.

7. A system in communication with a storage system, comprising:
    a processor;
    a computer readable storage medium including code executed by the processor to perform operations, the operations comprising:
        maintaining an assignment of a plurality of volumes to a data set, wherein the volumes are configured in the storage system;
        receiving a request to extend the data set;
        assigning a secondary allocation amount of available space from a current volume from which space was last assigned to extend the data set in response to the current volume having available space to extend the data set; and
        assigning a primary allocation amount of available space from a previously assigned volume comprising one of the volumes assigned to the data set other than the current volume having sufficient available space for the primary allocation amount when the current volume does not have available space for the secondary allocation amount.

8. The system of claim 7, wherein the primary allocation amount from the previously assigned volume is assigned an alias volume name, wherein the alias volume name provides an alternative name for the previously assigned volume and wherein the alias volume name was not previously assigned to the data set.

9. The system of claim 8, wherein assigned alias and base volume names comprise unique volume names not previously assigned to the data set to allow a preservation of an order in which the volumes were assigned to the data set, wherein the order can be determined by an ordering of the unique volume names of the alias and base volume names assigned to the data set.

10. The system of claim 7, wherein the operations further comprise:
assigning the primary allocation amount of available space in a volume not assigned to the data set to extend the data set when the volumes assigned to the data set including the current volume do not have available space to extend the data set.

11. The system of claim 7, wherein the operations further comprise:
determining whether the previously assigned volume has an assigned alias volume name already assigned to the data set;
assigning the primary allocation amount for the assigned alias volume name when the assigned alias volume name was not assigned to the data set;
assigning an additional alias volume name to the previously assigned volume in response to determining that the assigned alias volume name assigned to the previously assigned volume was previously assigned to the data set; and
assigning the available space in the additional alias volume name to extend the data set in response to assigning the additional alias volume name to the volume.

12. The system of claim 7, wherein the primary allocation amount for the data set comprises an allocation amount of available space when space in the volume and alias volume is first assigned to the data set, and wherein the secondary allocation amount for the data set comprises an amount of space that must be available in the current volume when assigning available space to the data set following the space first assigned.

13. A method, comprising:
maintaining an assignment of a plurality of volumes to a data set, wherein the volumes are configured in a storage system;
receiving a request to extend the data set;
assigning a secondary allocation amount of available space from a current volume from which space was last assigned to extend the data set in response to the current volume having available space to extend the data set; and
assigning a primary allocation amount of available space from a previously assigned volume comprising one of the volumes assigned to the data set other than the current volume having sufficient available space for the primary allocation amount when the current volume does not have available space for the secondary allocation amount.

14. The method of claim 13, wherein the primary allocation amount from the previously assigned volume is assigned an alias volume name, wherein the alias volume name provides an alternative name for the previously assigned volume and wherein the alias volume name was not previously assigned to the data set.

15. The method of claim 14, wherein an assigned alias and base volume names comprise unique volume names not previously assigned to the data set to allow a preservation of an order in which the volumes were assigned to the data set, wherein the order can be determined by an ordering of the unique volume names of the alias and base volume names assigned to the data set.

16. The method of claim 13, further comprising:
assigning the primary allocation amount of available space in a volume not assigned to the data set to extend the data set when the volumes assigned to the data set including the current volume do not have available space to extend the data set.

17. The method of claim 13, further comprising:
determining whether the previously assigned volume has an assigned alias volume name already assigned to the data set;
assigning the primary allocation amount for the assigned alias volume name when the assigned alias volume was not assigned to the data set;
assigning an additional alias volume name to the previously assigned volume in response to determining that the assigned alias volume name assigned to the previously assigned volume was previously assigned to the data set; and
assigning the available space in the additional alias volume name to extend the data set in response to assigning the additional alias volume name to the volume.

18. The method of claim 13, wherein the primary allocation amount for the data set comprises an allocation amount of available space when space in the volume and alias volume is first assigned to the data set, and wherein the secondary allocation amount for the data set comprises an amount of space that must be available in the current volume when assigning available space to the data set following the space first assigned.

19. The computer program product of claim 5, wherein the operations further comprise:
assigning an additional alias volume name to the previously assigned volume when the previously assigned volume does not have an assigned alias volume name.

20. The system of claim 11, wherein the operations further comprise:
assigning an additional alias volume name to the previously assigned volume when the previously assigned volume does not have an assigned alias volume name.

21. The method of claim 17, further comprising:
assigning an additional alias volume name to the previously assigned volume when the previously assigned volume does not have an assigned alias volume name.

* * * * *